United States Patent Office 2,830,978
Patented Apr. 15, 1958

2,830,978
PROCESS FOR THE PRODUCTION OF CROSS-LINKED PLASTICS

Karl E. Müller and Otto Bayer, Leverkusen-Bayerwerk, Germany, assignors to Farbenfabriken Bayer Aktiengesellschaft, Leverkusen, Germany, a corporation of Germany No Drawing. Application June 14, 1955
Serial No. 515,556

Claims priority, application Germany July 1, 1954

10 Claims. (Cl. 260—94.9)

The present invention relates to a process of producing cross-linked plastics and especially cross-linked polyethylene.

It is known that hydrocarbons of relatively high molecular weight, such as exist, for example in natural rubber or in the polymers of butadiene hydrocarbons, may be treated with aliphatic bisazo compounds (cf. "Angewandte Chemie," 63, 18–20). In this case, the more or less thermoplastic substances are converted into cross-linked products. The reason for this cross-linking reaction is based on the fact that unsaturated hydrocarbons can react with azo-dicarboxylic acid derivatives with displacement of hydrogen. By transferring this reaction to unsaturated hydrocarbons of high molecular weight, as they occur in natural rubber or in the polymers of butadiene hydrocarbons, and using bisazo compounds, the cross-linking reaction is produced by the aforementioned displacement of hydrogen.

This invention is based on the discovery that also saturated or substantially saturated thermoplastic polymerization products, such as exist in polyethylene and its chlorination products, can also react with cross-linking with aliphatic polyazo compounds which contain the grouping —OC—N=N—CO— at least twice in the molecule. The polyethylenes which are used may be prepared by any suitable known processes. Suitable polymers are for instance those which are obtained under pressure or without use of pressure. The polymerization may if necessary be carried out in the presence of any suitable catalysts, such as, for example, metal alkyls, and also compounds containing titanium. The polymers may be linear, slightly branched and also in part initially cross-linked. When using halogenated polyethylenes, it is desirable, but not necessary, to carry out the reaction in the presence of substances which bind hydrochloric acid, such as, for example, metal oxides, phenoxypropene oxide, β-phenyl indole, etc.

The reaction is carried out at temperatures higher than 100° C. preferably at about 120–220° C. and expediently takes place on a mixing roll. After incorporating the polyazo compound, of which about 2–10% are used (calculated on the amount by weight of polymer), the initially soft and tacky thermoplastic material becomes detached after some time from the hot roll in the form of a sheet. It may then be shaped in known manner in the hot state and under pressure. The admixture of the polyazo compound may, however, also be effected at temperatures of about 80–120° C. at which no or only little cross-linking takes place on the roll. The material initially treated in this manner may be stored without modification at room temperature and may only be transformed into the cross-linked condition at a later stage in the hot state and under pressure. The material prepared in this manner differs from the thermoplastic initial material by its low permanent elongation, its improved resistance to heat and its lower solubility in organic solvents.

Among the polyazo compounds suitable for carrying out the process of the invention, there are to be primarily mentioned the bisazo-dicarboxylic acid esters. The esters which have proved to be particularly advantageous are 1.4-butane- and ethane-bisazo-dicarboxylic acid ethyl-esters

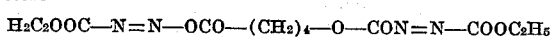

$$H_2C_2OOC-N=N-OCO-(CH_2)_4-O-CON=N-COOC_2H_5$$

which are obtained by processes by known per se by condensation of 1.4-butane- or 1.2-ethane-dichlorocarboxylic acid ester with hydrazine monocarboxylic acid ester and subsequent oxidation of the bisazo compounds. Instead of the aforementioned dichlorocarboxylic acid esters there may also be used those of hexanediol, diethyleneglycol, triethyleneglycol, tetraethyleneglycol. Suitable hydrazine monocarboxylic acid esters are the methyl-, ethyl-, n-butyl, isobutyl, propyl-, hexylester and higher alkyl esters.

Example 1

5 g. of 1.4-butane-bisazo-dicarboxylic acid diethyl ester are incorporated on a roll with 100 g. of polyethylene at a temperature in the region of 100–120° and the temperature is raised gradually to 170°. The initially viscous material hardens gradually in a period of 10 minutes and, after about 15 minutes, becomes detached from the hot roll as a sheet. This sheet may be pressed at a temperature of 170° and the slightly yellowish and practically transparent pressed sheets have the following mechanical properties:

| | |
|---|---|
| Strength | kg./cm.² 90.8 |
| Elongation | percent 105 |
| Permanent elongation | do 21 |

Solubility in trichloroethylene: 7.9 g. in 100 cc. The material does not undergo any deformation when heated to 120° C. Instead of the above ester there may be used ethane-bisazo-dicarboxylic acid diethyl ester under the same conditions as disclosed above, whereby reaction products of very similar properties are obtained.

Example 2

5 g. of 1.4-butane-bisazo-dicarboxylic acid diethyl ester are incorporated by rolling with 100 g. of polyethylene at a temperature of about 100–120°. The roll is cooled and there is obtained a material which can be stored indefinitely and which may subsequently be shaped with cross-linking, if necessary in an injection-moulding machine, at 200–220°. The shaped elements obtained in this way have the same properties as those indicated in Example 1.

Example 3

5 g. of lead oxide and 0.4 g. of phenoxypropene oxide or β-phenyl indole are incorporated in 100 g. of a polyethylene with a chlorine content of 8.5% and thereafter 5 g. of 1.4-butane-bisazo-dicarboxylic acid diethyl ester are incorporated therein by rolling at 120–130°. The initially tacky material hardens at 150–160° and becomes detached from the roll on cooling. After the product has been pressed, a material is obtained which has elastomeric properties.

What we claim is:

1. Process for the production of cross-linked plastics, which comprises treating a plastic selected from the group consisting of polyethylene and chlorinated products of polyethylene at temperatures higher than 80° C. with aliphatic polyazo compounds which contain the grouping —O—CO.N=N—COOR at least twice in the molecule, in which R stands for an aliphatic radical of 1–6 carbon atoms, said groupings being bound by way of the terminal oxygen atom to a polyvalent aliphatic radical, 2. Process according to claim 1, in which the polyvalent aliphatic radical of the aliphatic polyazo compound contains 1–8 carbon atoms.

3. Process according to claim 1, wherein the polyvalent aliphatic radical of the aliphatic polyazo compound is a bivalent aliphatic radical which is interrupted by oxygen atoms.

4. Process according to claim 3, wherein the polyvalent alkyl radical of the aliphatic polyazo compound is a polyethylene oxide radical.

5. Process for the production of cross-linked plastics, which comprises treating a plastic selected from the group consisting of polyethylene and chlorinated products of polyethylene at temperatures higher than 80° C. with aliphatic polyazo compounds of the formula $$R_2OOC-N=N.OC.O-R_1-O.CO.N=N-COOR_2$$

in which $R_1$ stands for a bivalent aliphatic radical and $R_2$ stands for a monovalent aliphatic radical.

6. Process for the production of cross-linked plastics, which comprises treating a plastic selected from the group consisting of polyethylene and chlorinated products of polyethylene at temperatures higher than 80° C. with aliphatic polyazo compounds of the formula $$R_2OOC-N=N.OC.O-R_1-O.CO.N=N-COOR_2$$

in which $R_1$ stands for a bivalent aliphatic radical the chain of which is interrupted by oxygen atoms and $R_2$ stands for a monovalent aliphatic radical.

7. Process for the production of cross-linked plastics, which comprises treating a plastic selected from the group consisting of polyethylene and chlorinated products of polyethylene at temperatures higher than 80° C. with aliphatic polyazo compounds of the formula $$R_2OOC-N=N.OC.O-R_1-O.CO.N=N-COOR_2$$

wherein $R_1$ stands for a bivalent aliphatic radical with 2–6 carbon atoms and $R_2$ stands for a monovalent aliphatic radical with 1–6 carbon atoms.

8. Process for the production of cross-linked plastics, which comprises treating a plastic selected from the group consisting of polyethylene and chlorinated products of polyethylene at temperatures higher than 80° C. with aliphatic polyazo compounds of the formula $$R_2OCC-N=N.OC.O-R_1-O.CO.N=N-COOR_2$$

wherein $R_1$ stands for a polyalkylene oxide radical and $R_2$ stands for a monovalent aliphatic radical with 1–6 carbon atoms.

9. Process for the production of cross-linked plastics, which comprises treating a plastic selected from the group consisting of polyethylene and chlorinated products of polyethylene at temperatures higher than 80° C. with 1.4-butane-bis-azodicarboxylic acid ethyl ester.

10. Process for the production of cross-linked plastics, which comprises treating a plastic selected from the group consisting of polyethylene and chlorinated products of polyethylene at temperatures higher than 80° C. with 1.2-ethane-bis-azodicarboxylic acid diethylester.

References Cited in the file of this patent

FOREIGN PATENTS 619,905      Great Britain   ---------- Mar. 16, 1949